(12) United States Patent
Steinbuch et al.

(10) Patent No.: US 10,598,766 B2
(45) Date of Patent: Mar. 24, 2020

(54) DEVICE FOR ASCERTAINING OPERATING DATA FOR A RADAR SENSOR

(71) Applicant: Robert Bosch GmbH, Stuttgart (DE)

(72) Inventors: Dirk Steinbuch, Wimsheim (DE); Karin Moertlbauer, Weil Der Stadt (DE); Matthias Steinhauer, Steinheim (DE); Michael Ott, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 15/428,575

(22) Filed: Feb. 9, 2017

(65) Prior Publication Data

US 2017/0248685 A1    Aug. 31, 2017

(30) Foreign Application Priority Data

Feb. 25, 2016 (DE) .................. 10 2016 202 936

(51) Int. Cl.
| | |
|---|---|
| *G01S 7/35* | (2006.01) |
| *G01S 13/93* | (2006.01) |
| *G01S 13/34* | (2006.01) |
| *G01S 13/931* | (2020.01) |

(52) U.S. Cl.
CPC ............ *G01S 7/352* (2013.01); *G01S 13/931* (2013.01); *G01S 13/34* (2013.01)

(58) Field of Classification Search
CPC .......... G01S 13/12; G01S 13/22; G01S 13/34; G01S 13/343; G01S 13/347; G01S 13/58; G01S 13/931
See application file for complete search history.

(56) References Cited

U.S. PATENT DOCUMENTS

| | | | | | |
|---|---|---|---|---|---|
| 3,878,525 | A | * | 4/1975 | Alpers .................. | G01S 13/343 342/109 |
| 5,309,160 | A | * | 5/1994 | Powell .................... | G01S 13/70 342/128 |
| 5,325,097 | A | * | 6/1994 | Zhang ..................... | G01S 13/34 342/130 |
| 5,345,470 | A | * | 9/1994 | Alexander .............. | G01S 7/023 375/144 |
| 5,963,163 | A | * | 10/1999 | Kemkemian ........... | G01S 13/34 342/109 |
| 6,633,815 | B1 | * | 10/2003 | Winter .................. | G01S 13/956 701/301 |
| 6,646,587 | B2 | * | 11/2003 | Funai ..................... | G01S 13/26 342/26 R |
| 7,508,337 | B2 | * | 3/2009 | Morinaga ............... | G01S 7/352 342/109 |

(Continued)

FOREIGN PATENT DOCUMENTS

| | | |
|---|---|---|
| DE | 102012212888 A1 | 1/2014 |
| DE | 102014212280 A1 | 12/2015 |

*Primary Examiner* — Peter M Bythrow
(74) *Attorney, Agent, or Firm* — Norton Rose Fulbright US LLP; Gerard Messina

(57) ABSTRACT

A method for ascertaining operating data of a radar sensor, including transmitting defined data of a first subsequence of ramp signals to an RF component of the radar sensor; ascertaining the data of the remaining subsequences of the ramp signals from the defined values of the first subsequence with the aid of the RF component; and storing the ascertained data of the remaining subsequences in a first memory of the RF component.

14 Claims, 2 Drawing Sheets

(56) References Cited

U.S. PATENT DOCUMENTS

| | | | |
|---|---|---|---|
| 7,724,181 B2* | 5/2010 | Natsume | G01S 13/426 342/103 |
| 7,786,927 B2* | 8/2010 | Kondoh | G01S 7/35 342/109 |
| 7,791,530 B2* | 9/2010 | Puglia | G01S 7/352 342/128 |
| 8,077,076 B2* | 12/2011 | Walter | G01S 13/345 342/118 |
| 8,390,506 B2* | 3/2013 | Focke | G01S 13/345 342/112 |
| 8,872,674 B1* | 10/2014 | Subramanya | G01S 7/2926 340/933 |
| 9,354,304 B2* | 5/2016 | Kirsch | G01S 13/58 |
| 9,853,365 B2* | 12/2017 | Kumar | H01Q 23/00 |
| 2003/0052813 A1* | 3/2003 | Natsume | G01S 7/354 342/70 |
| 2004/0130482 A1* | 7/2004 | Lin | G01S 7/023 342/82 |
| 2005/0225481 A1* | 10/2005 | Bonthron | G01S 7/032 342/175 |
| 2007/0152871 A1* | 7/2007 | Puglia | G01S 7/352 342/70 |
| 2008/0100500 A1* | 5/2008 | Kondoh | G01S 7/35 342/109 |
| 2008/0122680 A1* | 5/2008 | Morinaga | G01S 7/352 342/109 |
| 2009/0140912 A1* | 6/2009 | Kato | G01S 7/35 342/70 |
| 2009/0309782 A1* | 12/2009 | Takabayashi | G01S 13/343 342/105 |
| 2010/0277361 A1* | 11/2010 | Focke | G01S 13/345 342/133 |
| 2010/0289692 A1* | 11/2010 | Winkler | G01S 7/4008 342/70 |
| 2011/0122014 A1* | 5/2011 | Szajnowski | G01S 7/023 342/109 |
| 2013/0069818 A1* | 3/2013 | Shirakawa | G01S 13/347 342/146 |
| 2014/0022111 A1* | 1/2014 | Kuehnle | G01S 13/584 342/109 |
| 2014/0253365 A1* | 9/2014 | Kirsch | G01S 13/58 342/112 |
| 2014/0347211 A1* | 11/2014 | Schoor | G01S 7/35 342/147 |
| 2015/0002332 A1* | 1/2015 | Bi | G01S 7/35 342/200 |
| 2015/0301172 A1* | 10/2015 | Ossowska | G01S 7/023 342/70 |
| 2016/0131742 A1* | 5/2016 | Schoor | H01Q 1/3233 342/128 |
| 2016/0187462 A1* | 6/2016 | Altus | G01S 7/35 342/175 |
| 2017/0131396 A1* | 5/2017 | Schoor | G01S 7/354 |
| 2018/0045819 A1* | 2/2018 | Cornic | G01S 13/28 |

\* cited by examiner

DEVICE FOR ASCERTAINING OPERATING DATA FOR A RADAR SENSOR

CROSS REFERENCE

The present application claims the benefit under 35 U.S.C. § 119 of German Patent Application No. DE 102016202936.3 filed on Feb. 25, 2016, which is expressly incorporated herein by reference in its entirety.

FIELD

The present invention relates to a method for ascertaining operating data for a radar sensor. The present invention furthermore relates to a radar sensor.

BACKGROUND INFORMATION

Frequency modulated continuous wave (FMCW) radar and chirp sequence modulation are two exemplary types of modulation which are used particularly frequently in automotive radar systems. The chirp sequence modulation is used primarily in corresponding radar sensors, which in contrast to the FMCW method allows the sensor parameters distance and speed to be ascertained separately from one another. For this purpose, a sequence of multiple identical, linear frequency ramps is emitted. In order to reduce memory requirements when explicitly programming each frequency ramp, a ramp generator offers the option of using data for the frequency ramps from a memory multiple times.

Conventionally, the chirp sequence modulation is supplement to the effect that the sequence of the frequency ramps itself represents a superimposed frequency ramp, for example as is described in German Patent Application No. DE 10 2014 212 280 A1 and DE 10 2012 212 888 A1. The center frequencies of the frequency ramps must thus rise continuously, as a result of which it is not possible to use a mechanism for repeating the frequency ramps, and thus data for every ramp signal must be explicitly stored in the memory. This means increased memory requirements, and due to the limited data rate of the control interface also a longer time for programming the ramp signals.

U.S. Patent Application Pub. No. 2010/0289692 A1 describes a method of a modulation sequence for generating ramp signals for radar sensors.

SUMMARY

It is an object of the present invention to provide an improved method for ascertaining operating data of a radar sensor.

The object may be achieved, for example, according to a first aspect by an example method for ascertaining operating data of a radar sensor. The example method includes, for example:
- transmitting defined data of a first subsequence of ramp signals to an RF component of the radar sensor;
- ascertaining the data of the remaining subsequences of the ramp signals from the defined values with the aid of the RF component; and
- storing the ascertained data of the remaining subsequences in a first memory of the RF component.

In this way, programming time may advantageously be saved since the ascertainment of ramp data may largely be carried out with the aid of the RF component. An ascertainment of the ramp data external to the RF component is not necessary, whereby a data transmission complexity between the RF component and an external microcontroller may advantageously be reduced. Advantageously, the method according to the present invention may be implemented in a simple manner, e.g., with the aid of firmware.

Preferred specific embodiments of the method according to the present invention are described herein.

One advantageous refinement of the method provides for the defined data of the first subsequence of the ramp signals to include the following: the start frequency of the ramp signal, and the stop frequency of the ramp signal. In this way, a simple option for ascertaining the data of the further subsequences of the ramp signals is advantageously provided.

One further advantageous refinement of the method provides for the data of the remaining subsequences of the ramp signals to be ascertained by incrementing the start frequency and the stop frequency by a frequency increment. This supports a simple ascertainment of the data of the further subsequences of the ramp signals.

One further advantageous refinement of the method provides for the defined data of the first subsequence of the ramp signals to include the following: the start frequency of the ramp signal, the duration of the ramp signal, and the slope of the ramp signal. In this way, an alternative option for ascertaining the data of the further subsequences of the ramp signals is provided.

A further advantageous refinement of the method provides for all data of the subsequences to be stored in the first memory with the aid of a sequence control device of the RF component, in each case prior to the start of a cyclic passage of the method, the data of the next subsequence of the ramp signals being written to the content of the first memory, the frequency increment being retrieved from a second memory. In this way, a further variant of the method is provided, which in addition to saving programming time also allows ramp memory to be saved.

The present invention is described in greater detail hereafter with further features and advantages based on several figures. All described or illustrated features, either alone or in any arbitrary combination, form the subject matter of the present invention, regardless of their wording or representation in the description or in the figures.

Disclosed method features result similarly from correspondingly disclosed device features, and vice versa. This means in particular that features, technical advantages and statements regarding the method for ascertaining operating data of a radar sensor result similarly from corresponding statements, features and advantages regarding a radar sensor, and vice versa.

DETAILED DESCRIPTION OF EXAMPLE EMBODIMENTS

In accordance with the present invention, a formation of a linear frequency ramp signal from ramp to ramp is carried out according to defined rules, and may thus be calculated by an RF component itself, e.g., in the form of a monolithic microwave integrated circuit (MMIC). In this way, it is advantageously not necessary to ascertain all data for the frequency ramp signals with the aid of an externally situated microcontroller and to transmit these via a data bus to the RF component. As a result, a reduction in computing time is advantageously achievable. Advantageously, the method is independently able to write to ramp memories in the RF component according to a predefined pattern via a software or hardware mechanism.

Figure 1:
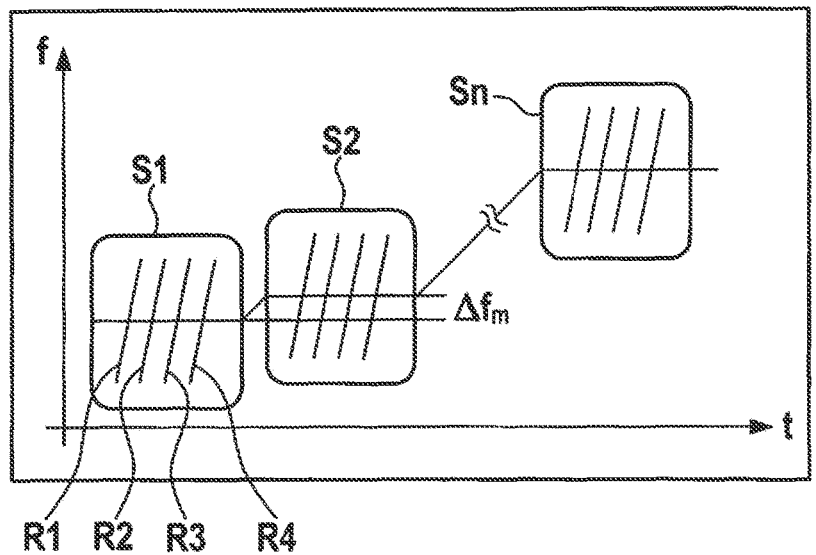
FIG. 1 shows a schematic representation of an active principle of a ramp signal generation for a radar sensor.

FIG. 1 basically shows the modulation mechanism for frequency ramps of the radar sensor, which is known per se and implemented with the aid of the provided method. A first subsequence S1 having m=4 ramp signals R1 . . . R4 is apparent, in this case the number four being provided only by way of example. Data of the first subsequence S1 are repeatedly generated or ascertained or programmed n times during the operation of the radar sensor, each subsequence S2 . . . Sn being shifted in its center frequency by the frequency increment Δfm compared to its predecessor toward a higher or lower frequency. Each of the four ramp signals R1 . . . R4 within the subsequence S1 . . . Sn has the same start sequence $f_{Start}$ and the same stop frequency $f_{Stop}$, with the aid of the four ramp signals R1 . . . R4 different antenna configurations being implementable. Preferably, the four ramp signals are designed with slightly different parameters in order to thus optimize illumination scenarios for the radar sensor, for example to implement a far range mode and/or a near range mode of the radar sensor.

Such ramp signals are formed of a very large number of small individual steps, such a stepped signal being applied to an analog voltage-controlled oscillator (VCO), and steps being eliminated from the stepped signal with the aid of a low pass behavior of a phase-locked loop (PLL). As a result, the emitted ramp signal of the radar sensor is thus linear and stepless.

In a first specific embodiment of the provided method, it is provided that data of ramp signals R1 . . . R4 are externally programmed only once and transmitted to the RF component, whereby computing time may be saved. The described calculation of the data for the ramp signals takes place for all further ramp blocks or subsequences S2 . . . Sn inside the RF component. Using a software or hardware mechanism within the RF component, the remaining data of remaining subsequences S2 . . . Sn are ascertained and stored in a memory of the RF component provided for this purpose.

Figure 2:
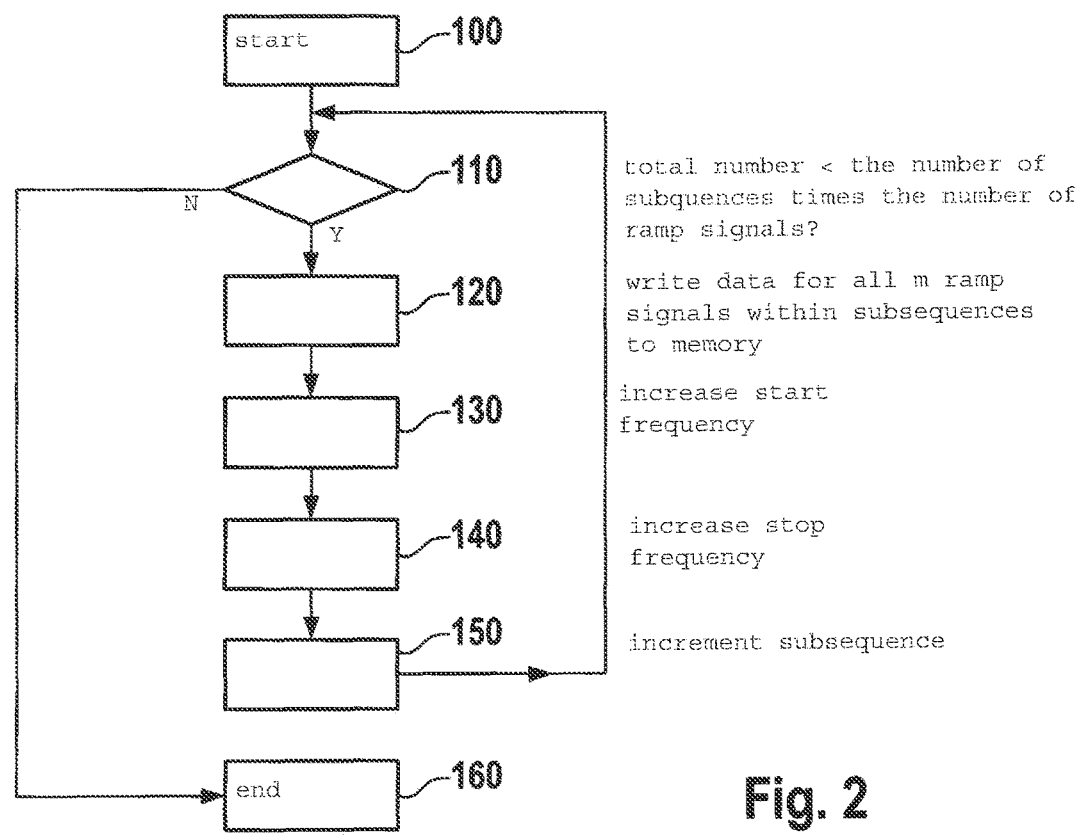
FIG. 2 shows a flow chart of one specific embodiment of the method according to the present invention.

FIG. 2 shows a corresponding schematic flow chart for carrying out the described method:

In a step 100, the method is started.

In a step 110, a query takes place out as to whether the total number is smaller than the number of subsequences S1 . . . Sn times the number of ramp signals R1 . . . Rm. If this is the case, data for all m ramp signals R1 . . . Rm within the subsequence are written to a corresponding memory of RF component 10.

In a step 130, an increase or incrementation of the start frequency $f_{Start}$ of the ramp signals of the subsequence by the frequency increment Δfm takes place.

In a step 140, an increase or incrementation of the stop frequency $f_{Stop}$ of the ramp signals of the subsequence by the frequency increment Δfm takes place.

In a step 150, an incrementation of the subsequence and a branching into step 110 take place.

In the event that, in step 110, the total number of the subsequences was already reached, the method branches to the end of the method in step 160; otherwise, a new passage of the method takes place up to step 150.

All ramp signals are generated in this way from the m programmed ramp signals in that these are copied and subsequently the start and stop frequencies are increased by the frequency increment Δfm. In the event that the stop frequency results from the start frequency, the duration of the ramp and the slope of the ramp, the incrementation of the stop frequency may also be eliminated.

Advantageously, the described method may be implemented, e.g., with the aid of a firmware of RF component 10, but alternatively may also be implemented with the aid of software or with the aid of hardware.

In one further specific embodiment of the method, ramp memory may advantageously also be saved, in addition to the programming time, by not writing ramp signal data according to the above-described method to an extensive area of the memory, but by manipulating data of all ramp signals in a limited area of the memory.

The described specific embodiment thus dispenses with the writing to the ramp memory for all ramp signals, the change in the center frequency being achieved by a manipulation of the already programmed ramp signals. In this way, in addition to saving computing and programming time, a reduced memory complexity may also be achieved.

Figure 3:
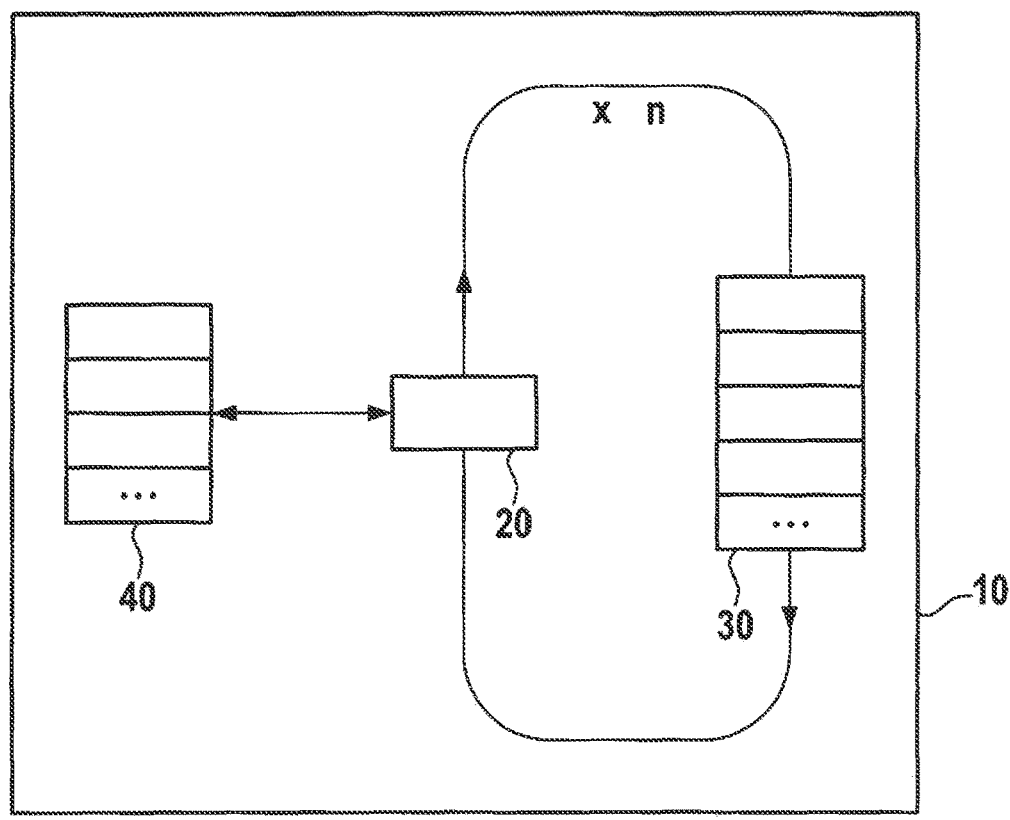
FIG. 3 shows a schematic representation of one further specific embodiment of the method according to the present invention.
Figure 4:
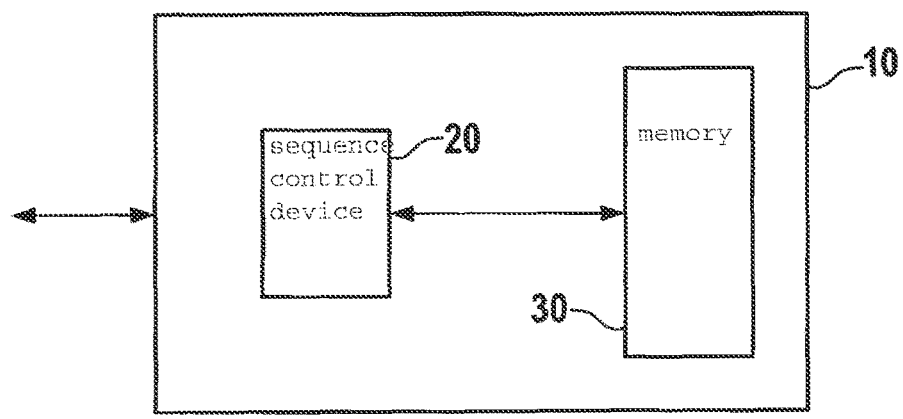
FIG. 4 shows a schematic block diagram of a radar sensor according to the present invention.

FIG. 3 shows a schematic representation of the described further specific embodiment of the method. In a right-hand section of FIG. 3, a memory 30 of RF component 10 is apparent. An n-fold cyclic passage of the method is indicated by a loop structure, memory 30 being cyclically manipulated or written to in each case from top to bottom. For this purpose, frequency increment Δfm is retrieved from a second memory 40 using a sequence control device 20, second memory 40 also being situated in RF component 10.

Thereafter, the passage of the loop is carried out n times in the above-described manner corresponding to the number of the subsequences, a specific area of first memory 30 being manipulated in each case. In this way, complexity of first memory 30 and computing time may be reduced since the manipulation of the specific area of first memory 30 and the retrieval of frequency increment Δfm take place prior to the start of the new passage of the loop. At the beginning of the new passage of the loop, all changed ramp signal data are thus already available in first memory 30.

Second memory 40 is thus only provided to store data for frequency increment Δfm, which in general remains unchanged, but if needed may also be changed in a simple manner. It is thus possible, for example, to define that the frequency increment Δfm is increased for each subsequence by a defined value, for example by 100 MHz, 200 MHz or by another suitable value.

Due to the fact that a manipulation of first memory 30 with the aid of hardware in the form of sequence control device 20 is carried out in the described further embodiment of the method, the manipulation of first memory 30 may advantageously take place very quickly.

In summary, a method for providing operating data of a radar sensor in a memory-efficient, automated manner is provided with the present invention, with the aid of which a powerful automotive radar sensor is implementable. By shifting the computing complexity of the ramp parameters or ramp signal data to the RF component, a primary controller of the radar sensor and a bus between the RF component and the primary controller may be efficiently relieved.

Due to the fact that RF circuits are implemented with analog processes having comparatively large structure widths, digital memory space is available only to a limited extent on such circuits. A digital circuit technology must thus be implemented using the described rough circuit structures. In the manner described above, the memory of the RF component, which by virtue of the system is already in short supply, may thus advantageously be optimally utilized.

Those skilled in the art will understand that the described features of the present invention may be suitably modified and combined with one another, without departing from the present invention.

What is claimed is:

1. A method for ascertaining operating data of a radar sensor, comprising:
   transmitting defined data of a first subsequence of ramp signals to an RF component of the radar sensor;
   ascertaining data of the remaining subsequences of the ramp signals from the defined data of the first subsequence with the aid of the RF component; and
   storing the ascertained data of the remaining subsequences in a first memory of the RF component, wherein within each subsequence the ramps grouped therein have a common start frequency, wherein the data of the remaining subsequences are ascertained exclusively by the RF component without aid of a controller external to the RF component ascertaining and transmitting such ascertained data to the RF component.

2. The method as recited in claim 1, wherein the defined data of the first subsequence of the ramp signals include the following: a start frequency of the ramp signal, and a stop frequency of the ramp signal.

3. The method as recited in claim 2, wherein the data of the remaining subsequences of the ramp signals are ascertained by incrementing the start frequency and the stop frequency by one frequency increment.

4. The method as recited in claim 1, wherein the defined data of the first subsequence of the ramp signals include the following: a start frequency of the ramp signal, a duration of the ramp signal, and a slope of the ramp signal.

5. The method as recited in claim 3, wherein all data of the subsequences are stored in the first memory with the aid of a sequence control device of the RF component, in each case prior to the start of a cyclic passage of the method, the data of the next subsequence of the ramp signals being written to the content of the first memory, the frequency increment being retrieved from a second memory.

6. A radar sensor, comprising:
   an RF component; and
   a sequence control device which is designed to ascertain data for subsequences of ramp signals, defined data of a first subsequence of ramp signals being transmittable to the RF component, data of the remaining subsequences of the ramp signals being ascertainable from the defined values of the first subsequence with the aid of the RF component, and the ascertained data of the remaining subsequences of the ramp signals being storable in a first memory of the RF component, wherein within each subsequence the ramps grouped therein have a common start frequency, wherein the data of the remaining subsequences are ascertained exclusively by the RF component without aid of a controller external to the RF component ascertaining and transmitting such ascertained data to the RF component.

7. The radar sensor as recited in claim 6, wherein the defined values of the first subsequence of the ramp signals include the following: a start frequency of the ramp signal, and a stop frequency of the ramp signal.

8. The radar sensor as recited in claim 7, wherein the data of the remaining subsequences of the ramp signals are ascertainable from an incrementation of the start frequency and the stop frequency by one frequency increment.

9. The radar sensor as recited in claim 7, wherein the data of the further subsequences of the ramp signals are ascertainable from the start frequency and a frequency increment.

10. The radar sensor as recited in claim 8, wherein, with the aid of the sequence control device, data of the remaining subsequences are storable in the first memory and data of the frequency increment are retrievable from a second memory.

11. A non-transitory computer-readable storage medium on which is stored a computer program for ascertaining operating data of a radar sensor, the computer program, when executed by an processor, causing the processor to perform:
   transmitting defined data of a first subsequence of ramp signals to an RF component of the radar sensor;
   ascertaining data of the remaining subsequences of the ramp signals from the defined data of the first subsequence with the aid of the RF component; and
   storing the ascertained data of the remaining subsequences in a first memory of the RF component, wherein within each subsequence the ramps grouped therein have a common start frequency, wherein the data of the remaining subsequences are ascertained exclusively by the RF component without aid of a controller external to the RF component ascertaining and transmitting such ascertained data to the RF component.

12. The method as recited in claim 1, wherein the RF component is a monolithic microwave integrated circuit.

13. The radar sensor as recited in claim 6, wherein the RF component is a monolithic microwave integrated circuit.

14. The non-transitory computer-readable storage medium as recited in claim 11, wherein the RF component is a monolithic microwave integrated circuit.

* * * * *